Fig. 4

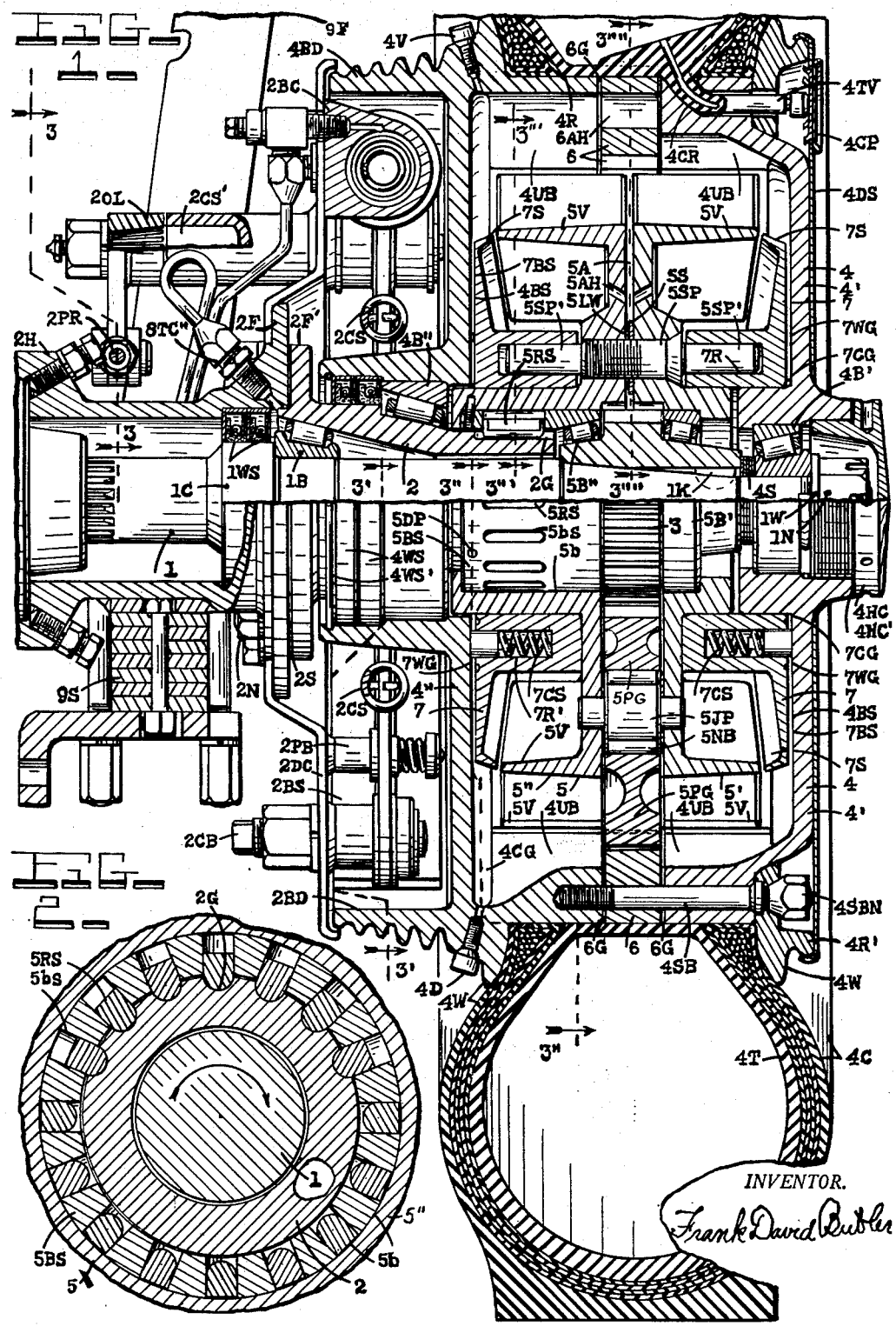

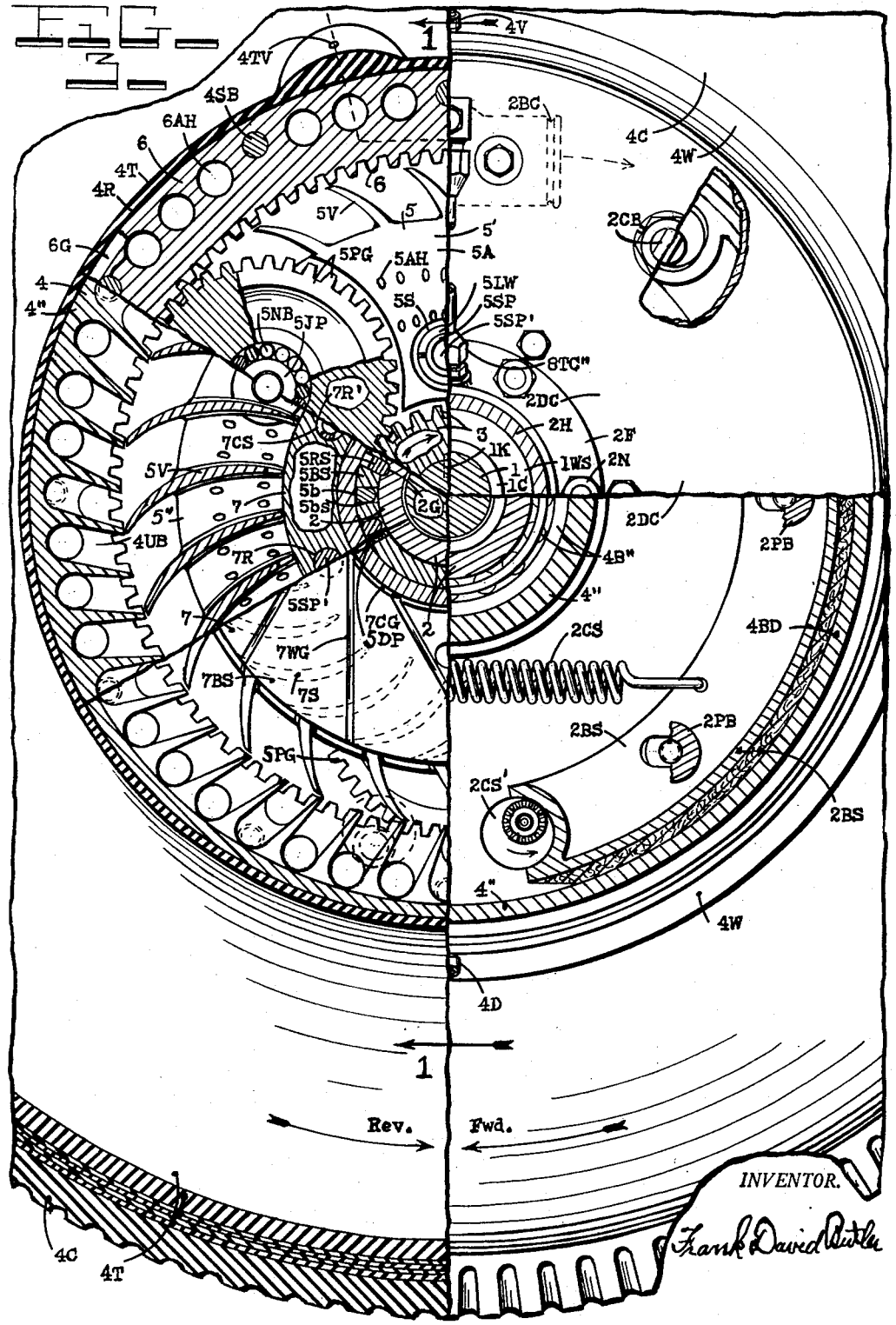

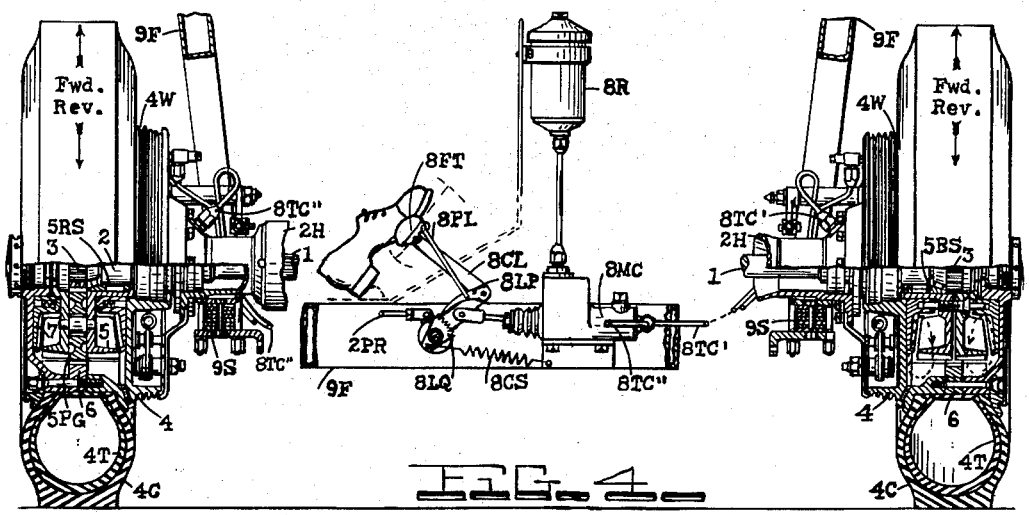

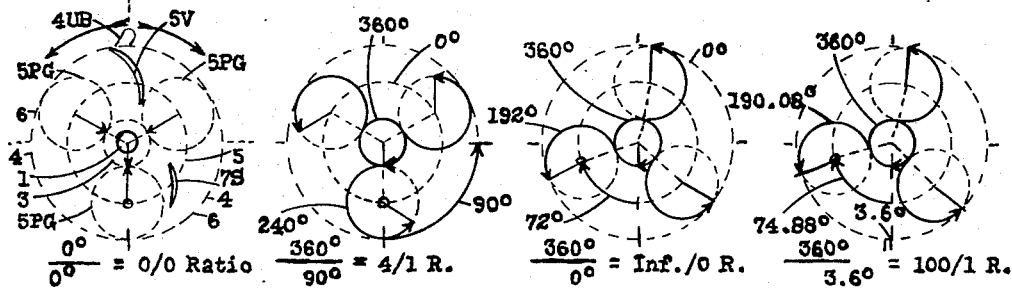

Fig. 5 — Starting Position; Reverse; Forward. $\frac{0°}{0°}$ = 0/0 Ratio

Fig. 6 — Reverse; (Backing). $\frac{360°}{90°}$ = 4/1 R.

Fig. 7 — Hold Position; (Idling). $\frac{360°}{0°}$ = Inf./0 R.

Fig. 8 — Heavy Torque; Starting out. $\frac{360°}{3.6°}$ = 100/1 R.

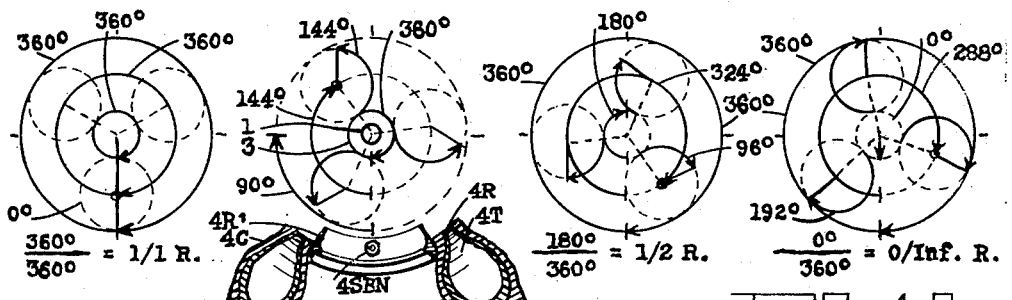

Fig. 9 — Fast Cruising; Free Wheeling. $\frac{360°}{360°}$ = 1/1 R.

Fig. 11 — Slow Cruising; Restricted Zones.

Fig. — Coasting; Engine Braking. $\frac{180°}{360°}$ = 1/2 R.

Fig. 12 — Coasting; Engine Stopped. $\frac{0°}{360°}$ = 0/Inf. R.

Fig. 10 — $\frac{360°}{90°}$ = 4/1 Ratio

INVENTOR.
Frank David Butler

United States Patent Office 2,763,166
Patented Sept. 18, 1956

2,763,166

COMBINED HYDRODYNAMICAL AND PLANETARY GEARING DRIVE

Frank David Butler, Venice, Calif.

Application June 9, 1953, Serial No. 360,534

13 Claims. (Cl. 74—752)

While my invention relates in general to combined hydrodynamical and planetary gearing driven couplers for use wherever applicable, it relates in particular to means for providing such type of coupler as variable and reversible at will as combined within and applicable in forming the hub assembly of an automotive vehicle traction wheel.

This improvement is particularly applicable to a combined hydrodynamical and planetary gearing driven, internal fluid pressure variable, transmission coupler equipped with a one direction rotatable power-shaft-driven sun-gear forming the driving member, a coaxially rotatable combined orbit-gear-carrier and multi-bucketed dual-flow closed fluid receptacle casing forming the gearing and hydrodynamically driven member, a coaxially rotatable combined planet-gear-carrier and multi-vaned dual flow fluid impeller forming the hydrodynamical driving and intermediate member, and, means for clutching said hydrodynamical driving and hydrodynamically driven members together either at will or progressively hydrodynamically to form a one to one gearing ratio therebetween. This invention provides means for making such type of coupler reversible within itself and comprises: an elongated tubular stator member projecting horizontally a predetermined distance to within said coupler and upon which the latter is rotatively journalled; an elongated tubular shaped bearing sleeve provided to be secured within and to be rotatable with said intermediate member and to closely fit over said stator member, and which sleeve is provided with a series of elongated, rectangular shaped, slots provided with an equal circular-pitch-spacing and each extending radially through said sleeve; a series of elongated rectangular shaped blades one for each, and each closely slidable radially within each, of said slots and each provided with an appreciable linear radial clearance therewithin; a series of elongated, substantially semi-circular shaped, grooves located in the upper one-half of said stator member and extending parallel with the axis of rotation beyond both ends of and each provided to mesh with one of said blades; means, operative under certain predetermined conditions of rotation of said intermediate member, whereby the application of said internal fluid pressure will provide engagement meshing between certain of said blades and all of said grooves and will thereby stop the rotation of said intermediate member and will result in said driven member being rotated in a reverse direction to that of said sun-gear; and means, operative radially within said intermediate member during the latter's rotation above a predetermined idling speed, that automatically locks all of said blades in a radially outward disengaged position within said slots of said sleeve.

While the coupler illustrated herein has a normal gearing ratio of four revolutions of said sun-gear to one revolution of said orbit-gear-carrier, it actually requires, with said orbit-gear-carrier stopped, five revolutions of said sun-gear to rotate said planet-gear-carrier, idly around said gun-gear, through 360° of arc. This is due to the fact that said planet-gear-carrier carries said planet-gears through 360° of arc during said five revolutions of said sun-gear. Thus the formula for the rotation of said intermediate member with said sun-gear is: one/ (gearing ratio plus one)=⅕. Likewise if said orbit-gear-carrier is rotated one revolution while said sun-gear is stopped, then said planet-gear-carrier would rotate idly with said orbit-gear-carrier, around said sun-gear, by formula: gearing ratio/(gearing ratio plus one) =⅘. Thus the total of the two idling ratios will always produce a one/one gearing ratio and makes the latter ratio possible in this type of combined coupler.

This type of coupler is designed to be preferably coupled directly to, a one direction rotatable internal combustion turbine motive power assembly unit forming a part of an axle housing of an automotive vehicle and provided with a shaft speed reducing means, and thereby placing the major weight of such vehicle directly upon its traction wheels and thus relatively lowering the center of gravity of such vehicle. Thus this coupler is particularly adaptable to racing cars wherein reversing of said traction wheels is seldom required, and wherein fast acceleration and a relatively high ultimate gearing ratio is riquired.

With reference to the drawings: Fig. 1 is a longitudinal section partly in side elevation as the coupler would appear on the dotted and broken line 1—1 of Fig. 3; Fig. 2 is an enlarged transverse section through the means for reversing the coupler within itself; Fig. 3 is the coupler illustrated in Fig. 1 in various transverse sections for better disclosure purposes and wherein the right upper quarter is as on line 3—3, the right lower quarter as on line 3'—3', the left lower 60° as on line 3''—3'', the left intermediate 60° as on line 3'''—3''', and, the left upper 60° as on the line 3''''—3'''' of Fig. 1; Fig. 4 illustrates two opposite traction wheels of an automotive vehicle wherein each wheel is provided with one of my coupler assemblies, while the intermediate portion of this figure diagrammatically illustrates the means for applying fluid under a variable pressure to each of such coupler assemblies; and, Figs. 5 to 12 inclusive are diagrammatical sketches illustrating different operating conditions of the coupler, starting with Fig. 5 with the rotative parts of the coupler at rest and in the positions they occupy in Figs. 1 and 3.

With further reference to the drawings, similar symbols thereof represent and indicate similar parts in the several views; the numeral 1 indicates the coupler driving shaft which extends between the motive power means and the combined coupler wheel assembly, and is preferably splined and supported, at its drive end, in a hub of an orbit gear of a reduction gearing means of a one direction rotative motive power assembly unit, and at its opposite end, is provided with a shoulder and an adjacent tapering portion provided with a half-moon type of key 1K, and also with a threaded portion and groove to respectively receive the securing nut 1N and tongued locking washer 1W, while immediately adjacent to the coupler proper it is supported and journalled in the flanged tubular stator member 2 upon the tapering roller bearing assembly 1B, which latter is shouldered against the collar 1C that forms a journal for the pair of wiper seal assemblies 1WS; a combined sun-gear and twin roller bearing journal cone 3 is a press-fit over said tapering portion of axle shaft 1 and is keyed to the latter by key 1K; and, wherein said flanged tubular stator member 2 is constructed of heat treated and hardened metal and is then machine ground throughout, and is provided to be flanged and bolted to the tubular axle-shaft housing 2H immediately adjacent the coupler proper.

The hydrodynamically driven member 4 of the coupler, forms the hub proper of the traction wheel assembly, is rotatable in both directions, and is supported, at one end thereof, by the tapering roller bearing assembly 4B" directly upon said tubular stator member 2 adjacent said housing 2H, and is indirectly supported at its opposite end on 2, via the tapering roller bearing assembly 4B', shaft 1 and tapering roller bearing assembly 1B, in a manner similar to the conventional front wheel support of an automotive vehicle, excepting that the shaft is rotatable; and, wherein numerous shims 4S are provided for adjusting said bearings 4B' and 4B", while said bearing 1B is provided with the adjustment gasket shims 2S after the conventional manner of semi-floating axle shaft adjustment shims.

The hydrodynamical driving member 5 of the coupler normally rotates in the same direction as the driving sun-gear 3 and is supported by the opposed pair of tapering roller bearing assemblies 5B' and 5B" which latter are adjustable by the shims 5S located between the halves of this intermediate member 5, which latter substantially rotatively floats around, and is journalled upon, said sun-gear 3 as it is driven both by the latter and is simultaneously carried forward by and during the rotation of the orbit-gear 6.

The construction and assembly of this combined orbit-gear-carrier, and hydrodynamical and planetary gearing driven member 4 of the coupler consists of: a halved type of closed fluid receptacle casing and orbit-gear-carrier (provided with an outer half 4' and an inner half 4") which form the hub proper of the traction wheel 4W having the traction tire casing 4C and tube 4T mounted in a flanged recess 4R which latter is closed on the outer side with the demountable rim-half 4R'; means in the form of a series of symmetrically spaced collared stud-bolts 4SB which secure the halves 4' and 4" together with the internally toothed orbit-gear 6 clamped intermediate to such halves and flanked with a relatively thin copper gasket 6G on either side thereof such gear, and wherein said stud-bolts are threaded into the inner one-half 4" and are shouldered against the outer one-half 4' of such driven member 4, and said demountable rim 4R' is secured on with the conical nuts 4SBN of said stud-bolts; a row of series of elongated U-shaped integral buckets 4UB symmetrically shaped inside around an annular shaped rim portion of each half member 4' and 4" and forming dual fluid driven buckets of such member 4 and which extend slightly tangential into said rim portion in the direction of rotation of member 3 therein such coupler; a flanged hub-cap 4HC, provided with a copper gasket 4HC', is provided to be threaded into, and to thus close, a hub portion of the outer member 4', while a pair of wiper seals 4WS, provided with a spring retainer ring 4WS', are mounted in and thus close a hub portion of the inner member 4"; an air cooled brake drum 4BD is provided integral with the latter half 4" for stopping and holding the coupler wheel assembly, and which will be described more in detail later; a pair of conically flanged socket-headed cap-screws 4D and 4V are threaded into the rim of the inner one-half 4" and extend into the annular shaped bucket clearance groove 4CG, and are respectively for draining and venting the driven member 4; and, a curved recess 4CR is provided within the outer half 4' for access of the tube 4T inflation valve 4TV, and which recess 4CR extends through the demountable rim 4R' and is capped over by the spring clip cover plate 4CP which is inserted into a recess in the chromed dust shield plate 4DS which is snapped over a bead on said rim 4R', and which rim as illustrated, is for a 7" tire on a 15" diameter rim.

The construction and assembly of this combined planet-gear-carrier and hydrodynamical driving intermediate member 5 of the coupler consists of: a halved type of floatable combined planet-gear-carrier and fluid circulating impeller having an outer half 5' and an inner half 5" which are bolted together by the series of collared socket-headed screw-pins 5SP, which latter are symmetrically spaced about the axis of rotation of said member 5, are provided with adjustment shims 5S and locking washers 5LW intermediate to said halves 5' and 5", and project out therebeyond the latter at each end in the form of cylindrical extensions 5SP' which latter will be described later; a row of series of one-quater-moon-shaped semi-radial and axially extending, integral vanes 5V of each half 5' and 5" provide dual fluid driving vanes for member 5 and which vanes extend slightly convexly in the direction of rotation of 5; a series of symmetrically spaced planet-gears 5PG which are each located between the halves 5' and 5" and mesh with said sun-gear 3 and said orbit-gear 6, and wherein each rotates on a series of elongated cylindrical needle-bearings 5NB which latter are journalled on the collared journal pin 5JP of their respective planet-gear 5PG, and wherein each journal pin is pressed into the halves 5' and 5"; and, means of circulating a relatively small quantity of fluid inward radially through the access 5A between the halves 5' and 5" and outward radially through the diagonally extending access holes 5AH in said halves 5' and 5".

A pair of flanged, annular shaped, opposed clutch-shoes 7 are provided with one interposed between either side of said intermediate planet-gear-carrier member 5 and the adjacent side wall of the driven member 4, and wherein each clutch-shoe is provided with: means of sliding axially upon a cylindrical hub portion of said member 5; a series of recesses 7R whereby it is rotatively driven by the adjacent extensions 5SP' on the adjacent ends of the screw-pins 5SP; a second series of similar size recesses 7R' with one located intermediate to each of the recesses 7R and provided to each contain a coil spring 7CS which latter collectively provide each clutch-shoe 7 with an initial relatively slight axial displacement thrust away from the adjacent side wall clutching surfaces 4BS of said driven member 4 at rotative speeds below idling speed; a series of obliquely extending relatively sharp-edged combined fluid circulating and wiper grooves 7WG located in the clutching surface 7BS of their respective clutch-shoe 7 and initiating in the annular fluid circulating groove 7CG therein; and, a series of symmetrically spaced concave scoops 7S that are located opposite to the clutching surface 7BS of each clutch-shoe 7 and are provided for inducing fluid inward radially from the adjacent ends of the 4UB buckets in the driven member 4 and then forcing it axially into the impeller 5.

While practically any remote means could be used for applying fluid, under a variable pressure, to within the driven member 4 via the tubing connection 8TC" on the housing 2H, a convenient method is diagramamtically illustrated in the intermediate portion of Fig. 4, and wherein: fluid, under a static head, is supplied from a vented reservoir 8R to a common, variable hydraulic pressure, master brake cylinder means 8MC provided with twin tubing connections 8TC' and 8TC" leading to each coupler via housing 2H, and which master cylinder is also provided with the usual reciprocating plunger operatable by the pivoted crank lever 8CL; and wherein the latter is provided with a pivoted foot-treadle 8FT and a pivoted latching pawl 8LP which are joined together by a connecting link 8PL, and is also provided further with a retracting coil spring 8CS and a notched stator latching quadrant 8LQ; and, whereby through such an assembly, fluid under a variable hydraulic pressure may be supplied simultaneously to, at least two, oppositely located couplers as illustrated in said Fig. 4, and wherein any desirable pressure may be temporarily held by latching pawl 8LP in said quadrant 8LQ.

With reference to Figs. 1 to 6 inclusive, the means by which the coupler is reversible within itself consists briefly of: a specially constructed cup for the roller bearing 5B", which is in the form of an elongated annular shaped sleeve 5BS which is a press-fit into the bore 5b of member 5", and is prevented from rotating therein by the series of dowel pins 5DP, and is provided with the bearing cup in one end and a series of symmetrically spaced rectangular shaped slots 5bs in the intermediate portion thereof; a series of elongated rectangular shaped blades and/or slides 5RS which latter are carried in the slots 5bs by the one direction rotative member 5 and subjected thereby to centrifugal force action within said slots, and wherein each such slide may be provided with rounded ends, a rounded inner radium edge, a flat outer radius edge and to be a snug slidable fit within its respective slot 5bs; and a series of semi-circular shaped elongated grooves 2G located in the same plane as said slides 5RS and similarly spaced in the top one-half only of said tubular stator member 2, and wherein said slides may be lockable in said grooves by fluid under pressure whenever the member 5 is stopped and/or is rotating at or below idling speed.

Under the conditions mentioned, and as illustrated in such Fig. 2; as long as the sun-gear is rotating and the fluid pressure is held within member 4, the coupler will reverse as in Fig. 6 and until such pressure is released, whereupon, the upper slides 5RS will be lifted by the tendency of the member 5 to rotate forward and to thereby generate centrifugal radial force, and also due to the fact that there would no longer be any pressure holding such slides 5RS sealed against the semi-circular surfaces of the grooves 2G; and, the planet-gear carrier member 5 would then resume forward rotation as in Fig. 7, while the slides 5RS would all be locked in their radially outward positions, as in the lower half of Fig. 2, by the centrifugal force of above normal idling rotation of said member 5.

Inasmuch as the coupler may be used for rotatively driving a traction pulley, or the like, substantially in the form illustrated for rotatively driving a traction wheel, it should be provided with a combined hydraulically and manually operable means for braking the driven member 4 of the coupler, in either direction of its rotation, thus such a means is provided, and consists briefly of: an air cooled brake-drum 4BD integral with the half 4″ of and rotatable with the driven member 4; a halved type of removable, annular shaped, dust cover disk 2DC secured to the flange 2F of the axle housing 2H and which supports the stator elements of the braking means; a series of projecting bosses 2PB integral with each half dust cover 2DC and each provided with means for resiliently locating the half brake-shoes 2BS, which latter are retracted by the pair of coil springs 2CS, in the same plane with the braking surface of said brake drum 4BD; a cam-shaft means 2CS′ for manually operating each brake-shoe half 2BS and which is provided to be journalled in a boss forming a part of 2DC and to be secured to a serrated operating lever 2OL which is connected to its mate lever by an adjustable pull-rod 2PR; a dual type of conventional hydraulic brake cylinder assembly 2BC; and, a means similar and located parallel to the fluid pressure means illustrated in the intermediate portion of Fig. 4 for simultaneously operating such brake-shoe halves both hydraulically and mechanically, and wherein the cam-shafts 2CS′ are used for adjusting the brake-shoe halves to within close proximity to the braking surface of said drum 4BD.

Considerable time and effort were expended in providing this coupler wheel assembly with simple, efficient, presentable combinations of the various essential parts that provide it in the form of an internal fluid pressure variable reversible transmission means contained within itself, and wherein: substantially all rotative metal parts are located within the flank limits of the pneumatic tire casing 4C; the latter is mounted in such manner that it can be conveniently removed for repairs without molesting the coupler proper; the entire braking equipment, carried on the halved dust cover 2DC, can likewise be conveniently removed for relining of the brake-shoe-halves 2BS etcetera; the sun-gear 3, planet-gears 5PG and orbit-ring gear 6 are all located on the wheel center-line so that dual fluid circulation and dual clutching could be accomplished on either side thereof between the hydrodynamical driving member 5 and driven member 4 and so that both could be made in halved form; substantially all of the U-shaped buckets 4UB are interconnected by large access holes 6AH, in the orbit-gear 6, for the purpose of equalizing fluid circulation between the two rows of such buckets; each clutch shoe 7 is provided with a series of concave helical scoops 7S for inducing fluid inward radially from the ends of buckets 4UB and then forcing it axially into the impeller 5 and thus simultaneously providing each clutch shoe with an initial axial thrust towards the adjacent clutching surface 4BS of the driven member 4 at rotative speeds above idling speed; the coupler and wheel assembly is supported to rotate (in either direction) substantially upon the tubular stator member 2, which latter is flanged at 2F′ and bolted to the tubular axle housing flange 2F with a series of stud-bolts and nuts 2N so that the assembly, including the axle-shaft 1, could be removed as a replacement unit etcetera; the vented fluid reservoir 8R is located above the level of the fluid couplers both for venting the fluid supply thereto and for refilling convenience; and, the couplers are both made reversible within themselves and the hubs proper of their respective wheel assemblies, in such manner as not to interfere with the fluid pressure clutching between said members 5 and 4 thereof, and in order to prevent accidental backing at above a critical idling speed.

The critical speed of rotation of the member 5 should be the normal idling speed of this member and is the speed of rotation at which the series of blades 5RS, as they are carried in the slots of the sleeve 5BS by member 5 over the top-surface of the periphery of member 2, will form contact with such top-surface of the stator member 2, and at which speed they may be forced and locked into mesh with the series of grooves 2G by the application of fluid pressure to within member 4, or may be released from such lock-meshing through the discontinuing of such fluid pressure application. Thus the rotation of said member 5 at any speed above its critical speed is not available for reversing of the coupler but is available for fluid pressure clutching between members 5 and 4.

Normally, during the reversing of the coupler, only sufficient fluid pressure is applied to result in the driven member 4 being reversed, and that will also result in the blades 5RS of one coupler acting in the capacity of an over-running device while backing around a corner. While backing the vehicle out of a mud hole, for example, sufficient fluid pressure should be applied to result in both members 4 being simultaneously reversed together so as to prevent independent wheel slippage. A relatively small amount of clutching between members 4 and 5, while reversing is not considered serious inasmuch as the member 5 must be first either slowed down or stopped in its rotation in order to accomplish reversing of said member 4.

In regards to certain construction details applicable to this coupler wheel assembly: the parts 2, 3, 6, 5PG, 5NB, 5JP, 5SP, 5RS and 5BS at least, should all be manufactured from a steel material suitable for roller bearing cups and cones and should be heat-treated and ground as necessary; the brake-shoe-halves 2BS should be operated by a combined mechanical and hydraulic operative means, and wherein the mechanical means may be either in the form as illustrated in Fig. 1, or as illustrated in Fig. 3 and wherein, by the method used in Figs. 1 and 4, the cam-shafts 2CS′ and conventional cam-bolts 2CB are initially used for centering the shoes 2BS within the drum 4BD, and otherwise used for adjusting said brake-shoes to within close proximity of said drum and for emergency braking; and, the coupler wheel assemblies should be rotatively journalled and supported substantially upon stator members 2, extending into each wheel, and not supported upon the axle shafts alone.

In practice, it is expected that minor changes may be made within the scope of the claims without digressing from the inventive concept.

I claim:

1. In a combined hydrodynamical and planetary gearing driven, internal fluid pressure variable, transmission coupler equipped with a one direction rotatable power-shaft-driven sun-gear forming the driving member, a coaxially rotatable combined orbit-gear-carrier, and multi-bucketed closed fluid receptacle casing forming the gearing and hydrodynamically driven member, a coaxially rotatable combined planet-gear-carrier and multi-vaned hydrodynamical driving impeller forming an intermediate member, and, means for clutching said hydrodynamical driving and driven members of said coupler, the provision and combination therein and therewith of means for reversing such coupler within itself, comprising: an elongated tubular stator member projecting horizontally a predetermined distance to within said coupler and upon which the latter is rotatively journalled; an elongated tubular shaped bearing sleeve provided to be secured within and to be rotatable with said intermediate member and to closely fit the periphery of said stator member, and which sleeve is provided with a series of elongated rectangular shaped slots provided with an equal circular-pitch-spacing and each extending radially through said sleeve; a series of elongated rectangular shaped blades, one for each and each closely slidable radially within each of said slots and each provided with an appreciable linear radial clearance therewithin; a series of elongated, substantially semi-circular shaped, grooves located in the upper one-half of said stator member and extending parallel with the axis of rotation beyond both ends of and each provided to mesh with one of said blades; means operative under certain predetermined conditions of rotation of said intermediate member, whereby the application of internal fluid pressure will provide engagement meshing between certain of said blades and all of said grooves and will thereby stop the rotation of said intermediate member and will thereby result in said driven member being rotative in a reverse direction to that of said sun-gear; and means operative radially within said intermediate member, during the latter's rotation above a predetermined idling speed, that automatically locks all of said blades in a radially outward disengaged position within said slots of said sleeve.

2. The coupler of claim 1 characterized by, a predetermined number of said series of blades being provided to mesh and to be pressure-locked within said grooves whenever said internal fluid pressure is applied when said coupler is stopped or is rotating at or below said predetermined idling speed, known as a critical speed.

3. The coupler of claim 1 characterized by, said means, operative under certain predetermined conditions of rotation of said intermediate member, whereby, whenever said internal fluid pressure is released subsequently to the reversing of said driven member, results in said intermediate member resuming its rotation.

4. The coupler of claim 1 characterized by, said means operative radially within said intermediate member while it is rotating above a predetermined idling speed, to consist of, said sleeve being provided to be a press-fit within an elongated bore within a hub of said intermediate member and thereby limiting the radial sliding of said blades within the slots of such sleeve, so that the centrifugal force of the intermediate member rotating, at above said normal idling speed, results in said blades locking against the inner periphery of said bore, and any fluid pressure applied, at such time, will lock said blades against said bore by pressure and will not affect clutching between said intermediate and driven members at such time.

5. The coupler of claim 1 characterized by, wherein said sun-gear is provided to be integral with a pair of tapering roller bearing journal cones with one of the latter on each side of the gear proper thereof and wherein one of the cups of one of such tapering roller bearings is formed integral within one end of said elongated tubular bearing sleeve.

6. In a combined hydrodynamical and planetary gearing driven transmission coupler forming the hub proper of a traction wheel of an automotive vehicle and equipped with, a one direction rotatable axle-shaft driven sun-gear forming the driving member, an annular shaped coaxially rotatable combined orbit-gear-carrier and dual-bucketed closed fluid receptacle casing forming the gearing and hydrodynamically driven member, an annular shaped coaxially rotatable combined planet-gear-carrier and dual-vaned hydrodynamical driving impeller forming an intermediate member of said coupler: and a variable fluid pressure means applicable to within said driven member, whereby, a pair of clutch-shoes rotatable with said intermediate member and resiliently interposed between the latter and said driven member, are simultaneously axially displaced within such driven member and thereby forms dual-clutching with a pair of adjacent surfaces rotatable with said driven member, the provision and combination therein and therewith of: a series of concave scoops integral with each of said clutch-shoes and provided to induce fluid inward radially during the rotation of said intermediate member; an elongated tubular shaped stator member projecting a predetermined distance horizontally into said coupler and upon which the latter is rotatively journalled; meshing means, carried by said intermediate member and operative between said stator member and said intermediate member during certain predetermined conditions of rotation of the latter, whereby the application of said fluid pressure results in pressure-locking such meshing means and thereby stops the rotation of said intermediate member, and results in said driven member rotating in a reverse direction to that of said sun-gear; means for centrifugally automatically discontinuing such reversing of said driven member whenever said fluid pressure means is released during such reversing operation; and, means operative radially within said intermediate member, while it is rotating at above a predetermined idling speed, that makes inoperative said reversing of said driven member by said variable fluid pressure means, without affecting the operation of said dual-clutching at such time.

7. The coupler of claim 6 characterized by, said meshing means, carried by said intermediate member, and operative between the latter and said stator member during certain predetermined rotating conditions of the former, to consist of: a series of elongated blades radially slidable one within each of a similar series of radially extending elongated slots which latter are provided with a symmetrical circular-pitch-spacing within an elongated tubular sleeve which latter is a press-fit within a suitable bore within said intermediate member and has a close internal fit to the periphery of said tubular stator member; wherein a series of elongated grooves are provided to extend axially within the upper one-half of the latter and to mesh-lock with said blades whenever said intermediate member is rotating at or below said predetermined idling speed and said fluid pressure is simultaneously applied to within said driven member; and, wherein said blades will be automatically locked out-of-mesh whenever said fluid pressure is released, subsequent to such mesh-locking, as said intermediate member is rotated at above said predetermined idling speed.

8. The coupler of claim 6 characterized by, wherein said elongated tubular stator member forms an extension of an axle-housing of said axle-shaft, and said driven member forms the hub proper of said traction wheel within which hub said driving sun-gear and said intermediate member are journalled to rotate.

9. The coupler of claim 6 characterized by, wherein the pressure-locking of said meshing means results in stopping the rotation of said intermediate member and thereby results in reversing the direction of rotation of said driven member in relation to the direction of rotation of said driving sun-gear, and, thus provides said coupler to be reversible within itself, while operating at or below a critical rotating speed.

10. In a combined hydrodynamical and planetary gearing driven transmission coupler forming the hub proper of a traction wheel of an automotive vehicle and equipped with, a one direction rotatable axle-shaft rotated sun-gear forming the driving member, a coaxially rotatable combined orbit-gear-carrier and multi-bucketed closed fluid receptacle casing forming the gearing and hydrodynamically driven member, a coaxially rotatable combined planet gear carrier and multi-vaned hydrodynamical driving impeller forming an intermediate member, an elongated tubular shaped stator member projecting a predetermined distance horizontally into said coupler and upon which the latter is journalled to rotate in either direction, and, a variable fluid pressure means, applicable via said stator member to within said driven member, by which at least one surface rotatable with said intermediate member may be variably axially displaced and clutched against at least one surface rotatable with said driven member, the provision and combination therein and therewith of: a series of circular-pitch-spaced elongated blades, carried in said intermediate member provided to be, pressure-mesh-locked, by said variable fluid pressure within a series of elongated grooves extending axially within the upper one-half of said stator member, during a predetermined rotation speed of said intermediate member and resulting in the reversing of said driven member; and, wherein said blades are automatically locked in a radially outward out-of-mesh position, within said intermediate member, whenever the latter is rotating at above a predetermined idling speed.

11. The coupler of claim 10 characterized by, whereby the pressure-mesh-locking of said series of blades in said series of grooves results in stopping the rotation of said intermediate member, and thereby reverses the direction of rotation of said driven member in relation to the direction of rotation of said driving sun-gear, and, thereby provides said coupler to be reversible within itself.

12. The coupler of claim 10 characterized by, wherein said blades carried in said intermediate member that are pressure-mesh-locked within said series of elongated grooves, in the upper one-half of said stator member, by the application of said variable fluid pressure to within said driven member, may be released at will by terminating such fluid pressure application and thereby resulting in said intermediate member resuming its idling speed of rotation, and, thereby terminating the reversing of said driven member.

13. In a combined hydrodynamical and planetary gearing driven transmission coupler forming the hub proper of a traction wheel of an automotive vehicle and comprising; a one direction rotatable axle-shaft-mounted sun-gear forming the driving member, a coaxially rotatable combined orbit-gear-carrier and dual row bucketed closed fluid receptacle casing forming the gearing and hydrodynamically driven member, a coaxially rotatable combined planet-gear-carrier and dual row vaned hydrodynamical driving impeller forming an intermediate member, and, a variable fluid pressure means applicable to within said driven member and whereby at least one surface rotatable with said intermediate member may be variably axially displaced and clutched against at least one surface rotatable with said driven member, the combination therein and therewith of: an elongated tubular shaped stator member projecting a predetermined distance horizontally into said coupler and upon which the latter is journalled to rotate in either direction, a series of circular-pitch-spaced elongated blades carried in said intermediate member and provided to be pressure-mesh-locked, by said variable fluid pressure, within a series of elongated groove extending actually within the upper one-half of said stator member, during a predetermined rotation speed of said intermediate member and resulting in the reversing of said driven member, and, wherein said blades are automatically locked in a radially outward out-of-mesh position, within said intermediate member, whenever the latter is rotated at above a predetermined idling speed.

References Cited in the file of this patent

UNITED STATES PATENTS

| | | |
|---|---|---|
| 2,572,310 | Brown | Oct. 23, 1941 |
| 2,658,592 | Polomski | Nov. 10, 1953 |